United States Patent
Ku

(10) Patent No.: US 9,009,909 B2
(45) Date of Patent: Apr. 21, 2015

(54) WINDSHIELD WIPER

(71) Applicant: Dongguan Hongyi Wiper Co., Ltd., Guang Dong (CN)

(72) Inventor: Yuan-Chin Ku, New Taipei (TW)

(73) Assignee: Dongguan Hongyi Wiper Co., Ltd., Dong Guan, Guang Dong (CN)

( * ) Notice: Subject to any disclaimer, the term of this patent is extended or adjusted under 35 U.S.C. 154(b) by 162 days.

(21) Appl. No.: 13/676,176

(22) Filed: Nov. 14, 2012

(65) Prior Publication Data

US 2013/0117957 A1 May 16, 2013

Related U.S. Application Data

(60) Provisional application No. 61/559,744, filed on Nov. 15, 2011.

(51) Int. Cl.
  *B60S 1/38* (2006.01)
  *B60S 1/40* (2006.01)

(52) U.S. Cl.
  CPC .............. *B60S 1/4019* (2013.01); *B60S 1/40* (2013.01); *B60S 1/3806* (2013.01); *B60S 1/3848* (2013.01); *B60S 2001/3812* (2013.01); *B60S 1/3801* (2013.01); *B60S 1/381* (2013.01); *B60S 1/3858* (2013.01); *B60S 2001/3815* (2013.01)

(58) Field of Classification Search
  CPC .......... B60S 1/38; B60S 1/381; B60S 1/3848; B60S 1/40; B60S 1/3806
  USPC ........................... 15/250.201, 250.43, 250.44, 15/250.451–250.454, 250.361, 250.46
  See application file for complete search history.

(56) References Cited

U.S. PATENT DOCUMENTS

| | | | | |
|---|---|---|---|---|
| 3,088,155 A * | 5/1963 | Smithers | ................. | 15/250.201 |
| 7,150,066 B1 * | 12/2006 | Huang | ..................... | 15/250.201 |
| 2004/0025280 A1 * | 2/2004 | Krickau et al. | ............ | 15/250.32 |
| 2004/0181894 A1 * | 9/2004 | Lee et al. | ................ | 15/250.201 |
| 2007/0289082 A1 * | 12/2007 | Herinckx et al. | ........ | 15/250.361 |
| 2008/0222832 A1 * | 9/2008 | Huang | ...................... | 15/250.43 |

FOREIGN PATENT DOCUMENTS

DE         2311293         * 9/1974

* cited by examiner

*Primary Examiner* — Gary Graham
(74) *Attorney, Agent, or Firm* — Li & Cai Intellectual Property (USA) Office

(57) ABSTRACT

The instant disclosure provides a wiper, comprising a wiper connector, a flexible member, a reinforcing member, a rigid frame, a plurality of fastening members and a wiper blade. The flexible member includes a central loading portion and two distal loading portion extending symmetrically from two ends of the central loading portion, where the central loading portion has a zero curvature. The reinforcing member is sleevingly coupled to the flexible member. A front-facing side of the reinforcing member has at least one wind-deflecting rib formed thereon. The rigid frame is arranged on the central loading portion to connect the wiper connector. The fastening member is engaged to the second loading portion. The wiper blade is inserted through the plurality of fastening members. Thus, a better conformity can be achieved between the windshield and the wiper through the wind pressure while driving to provide a better water removal effect.

6 Claims, 9 Drawing Sheets

WINDSHIELD WIPER

BACKGROUND OF THE INVENTION

1. Field of the Invention

The instant disclosure relates to a wiper; in particular, to a car-use windshield wiper.

2. Description of Related Art

Along with the increasing production of cars, the demands of car-use wipers have also increased dramatically. In order to ensure a safe ride, it has turned out to be a duty for car drivers to change their wipers regularly, and thereby, increasing the consumption of the wipers. Furthermore, the curvature of a windshield varies locationally. For instance, a conventional car-use wiper has multiple layers of metallic frames on the wiper blade, where the frames are pressed on the wiper blade to keep the wiper blade stably conform to the contour of the windshield during operation. However, as such type of conventional wiper has disadvantages such as having a more complex structure, a higher cost, a more difficult manufacturing process, and a heavier weight, thus has gradually been replaced by soft wipers.

On the other hand, although conventional soft wipers have a simpler structure and a lighter weight, such wipers only employs its soft frame to exert force on the windshield. As a result, the pressure gets smaller when it is closer to the edge of the soft frame. In other words, the lack of pressing force from the soft frame causes the water removal effect to be weaker along the edge of the wiper. Even worst, a portion of the wiper blade may not even be in firm contact with the windshield, and therefore fail to function properly as expected.

Furthermore, as the pressure from the soft frame is weaker, noise and unwanted rattling of the wiper may occur while the wiper is operating, and thereby shortening the service life of the wiper and bringing emotional disturbances to the driver.

SUMMARY OF THE INVENTION

The object of the instant disclosure is to provide a wiper, and through the different curvatures of the flexible member, the wiper can be conformed to the windshield of the car. During driving, the reinforcing member will redirect wind pressure to exert force on the wiper, such that a better conformity can be achieved between the wiper and the windshield.

The instant disclosure provides a wiper, comprising a wiper connector, a flexible member, a plurality of fastening members and a wiper blade. The flexible member includes a generally elongated central loading portion and two distal loading portions extending substantially symmetrically from two ends of the central loading portion, where the central loading portion has a zero curvature. The reinforcing member is inserted to the flexible member, and a front-facing surface of the reinforcing member has at least one wind-deflecting rib formed thereon. The rigid frame is arranged on the central loading portion to connect the wiper connector. The fastening member is engaged to the second loading members. The wiper blade is inserted through the fastening member.

In other words, the instant disclosure provides a wiper, comprising a wiper connector; a flexible member including a generally elongated central loading portion and two distal loading portion extending substantially symmetrically from two ends of the central loading portion, where the central loading portion has a zero curvature; a reinforcing member sleevingly coupled to the flexible member, and where the reinforcing member has at least one wind-deflecting rib formed on a front-facing side thereof; a rigid frame arranged on the central loading portion to connect the wiper connector; at least one fastening member engaged to each of the distal loading portion; and a wiper blade fixed by the fastening member.

The instant disclosure further provides a wiper, comprising a wiper connector, a reinforcing member, a flexible member, a rigid frame, a plurality of fastening members, a plurality of pressing members and a wiper blade. The flexible member includes a generally elongated central loading portion and two distal loading portions extending substantially symmetrically from two ends of the first loading, where the central loading portion has a zero curvature. The reinforcing member is inserted to the flexible member, and the front-facing side of the reinforcing member has at least one wind-deflecting rib formed thereon. The rigid frame is arranged on the central loading portion to connect the wiper connector. The fastening member is engaged to the flexible member. The pressing member includes a positioning portion, two hard arms and two coupling portions arranged on the distal ends of the hard arm. The positioning portion is engaged to the fastening member. The wiper blade is inserted through the coupling portions.

In other words, the instant disclosure further provides a wiper, comprising; a wiper connector; a flexible member including a generally elongated central loading portion and two distal loading portion extending substantially symmetrically from two ends of the first loading, where the central loading portion has a zero curvature; a reinforcing member sleevingly coupled to the flexible member, and where a front-facing side of the reinforcing member has at least one wind-deflecting rib formed thereon; a rigid frame arranged on the central loading portion for connection to the wiper connector; at least one fastening member, where the fastening member is engaged to the flexible member; at least one pressing member including a positioning portion, two hard arms and two coupling portions arranged on the distal ends of the hard arm, where the positioning portion is engaged to the fastening member; and a wiper blade fixed by at least one of the coupling portions.

The instant disclosure has the following advantages:

The flexible member has different curvatures thereon such that a better conformity can be achieved between the wiper and the windshield for better removal effect of rain water. Furthermore, the central loading portion of the flexible member has a zero curvature, and thereby the rigid frame can be engaged tightly to the central loading portion. Thus, the force exerted by the wiper arm can be applied to the wiper through the wiper connector with little or no resistance, and thereby inefficiency of the wiper due to gaps formed during assembling can be reduced. The instant disclosure has a rotatable engaging mechanism and a plurality of mountable engaging mechanism formed between the wiper blade and the flexible member, such that a convenient and stable assembly can be provided. Furthermore, cases where pursuing an easy dismantling method in conventional assembly, such that too much rotatable engaging mechanisms are used which result in easy detach of the wiper blade can be avoided. The wiper of the instant disclosure has a new form of reinforcing member to enable better conformity between the wiper and the windshield through the external wind pressure during driving, and thereby improving the water removal effect.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

The instant disclosure provides a windshield wiper. The windshield wiper is conformed to the windshield of a car through the force applied by a wiper arm. Furthermore, the wiper is capable of removing the rain water on the windshield through the repeated movement driven by the wiper arm.

[The First Embodiment]

Figure 1:
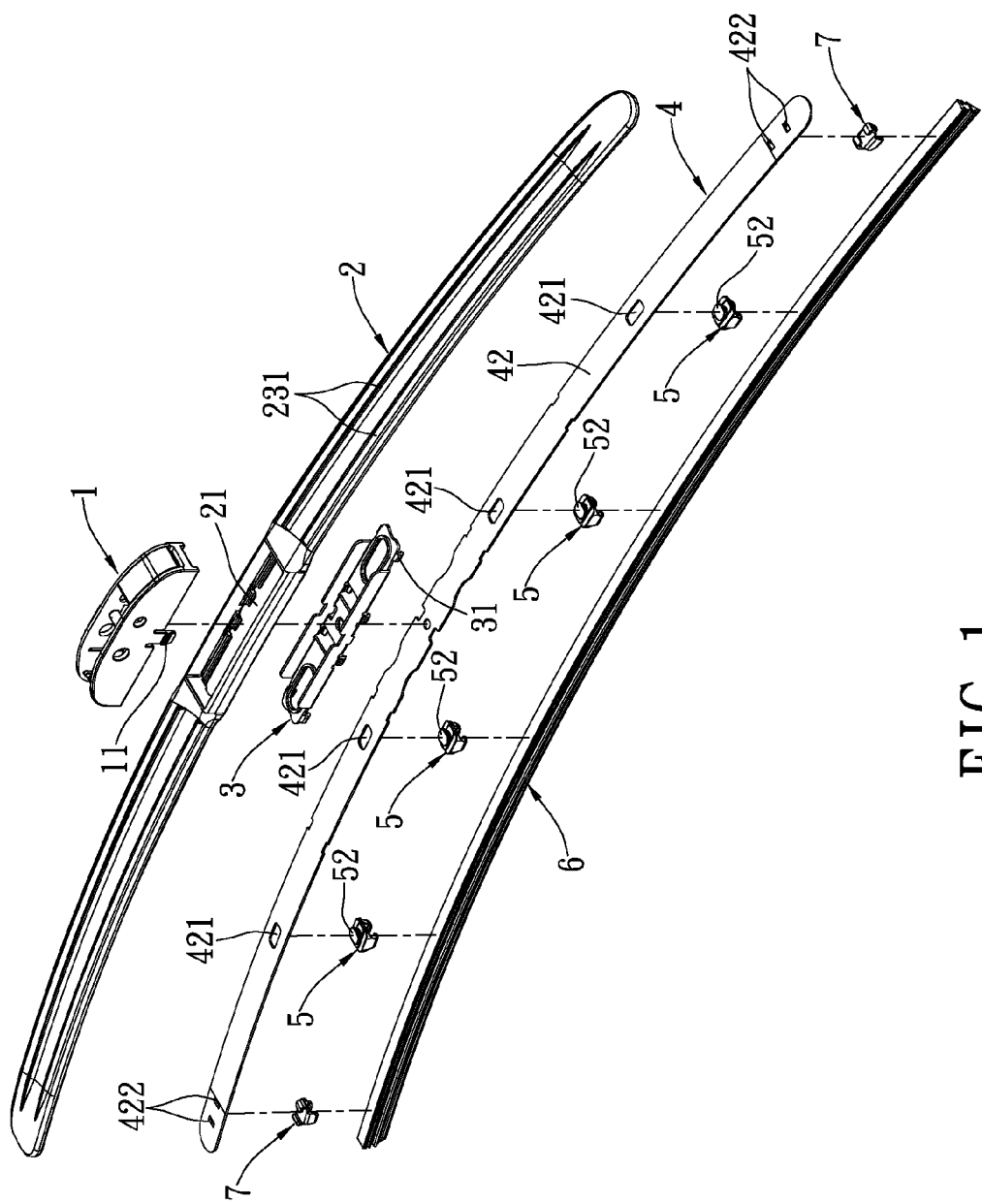
FIG. 1 shows a three-dimensional exploded view of a wiper according to a first embodiment of the instant disclosure.
Figure 2:
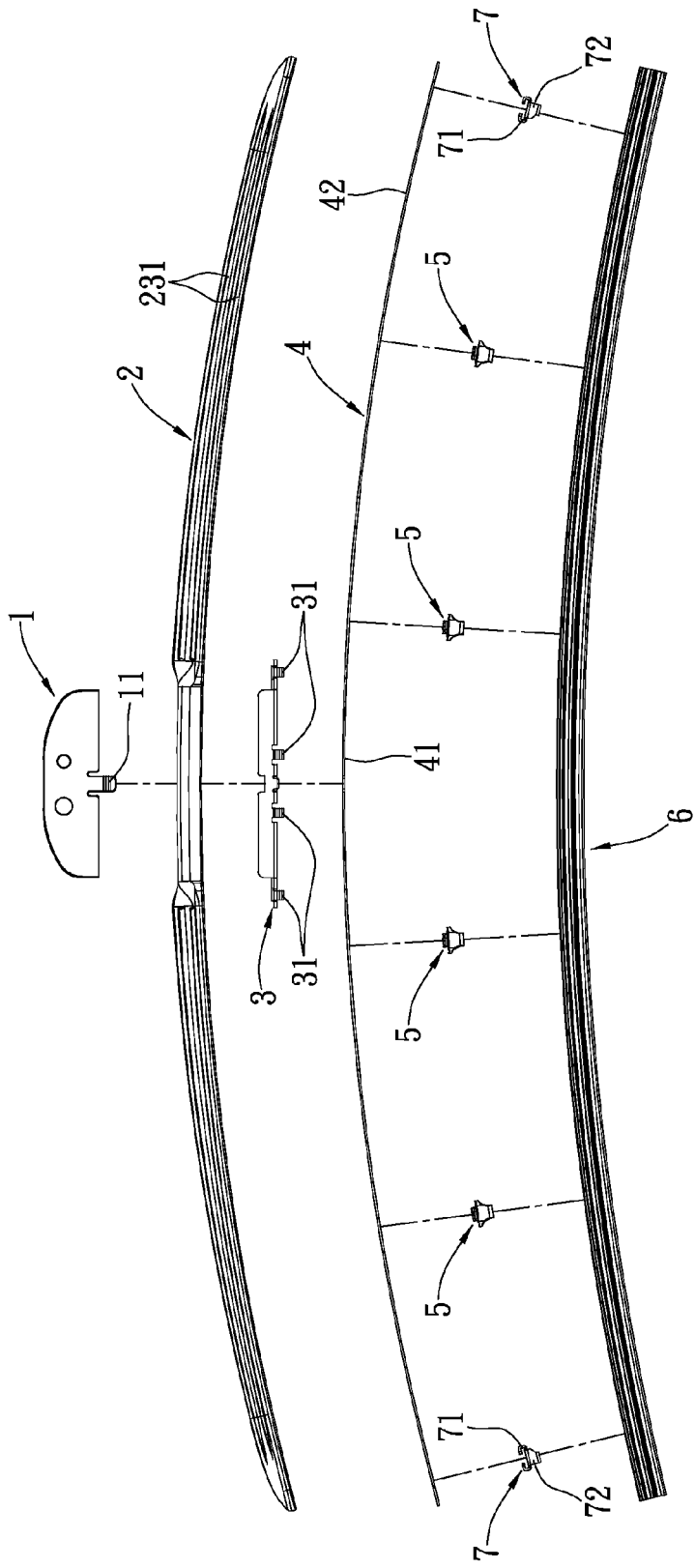
FIG. 2 shows an exploded view of the wiper observing from the front according to the first embodiment of the instant disclosure.

Please refer to FIGS. 1 and 2, the wiper of the instant disclosure includes a wiper connector 1, a reinforcing member 2, a rigid frame 3, a flexible member 4, a plurality of fastening member 5 and a wiper blade 6. The flexible member 4 has multiple curvatures formed thereon. To provide further explanations, the flexible member 4 is made up of a generally elongated central loading portion 41 and a second loading portion 42, where the central loading portion 41, having a zero curvature, is arranged in the center of the flexible member 4, and the second loading portion 42 extends substantially symmetrically from two ends of the central loading portion 41. Furthermore, the curvature of the second loading portion 42 is greater than that of the central loading portion 41.

The central loading portion 41 has a rigid frame 3 engaged thereon, where the rigid frame 3 has a plurality of folded portions 31 extending downwardly and inwardly for engagement to the central loading portion 41. For the instant embodiment, the rigid frame 3 is preferably made of a hard material, however, this is not restricted thereto, and the rigid frame 3 is able to assemble the wiper connector 1 thereto. The wiper connector 1 has an engaging portion 11 which extends downwardly therefrom, where the engaging portion 11 is mounted to engage within the rigid frame 3. As the connective surface between the wiper connector 1 and the rigid frame 3 is a planar surface, the inaccuracy can be minimized during assembly such that the force can be applied evenly on the wiper.

Figure 3:
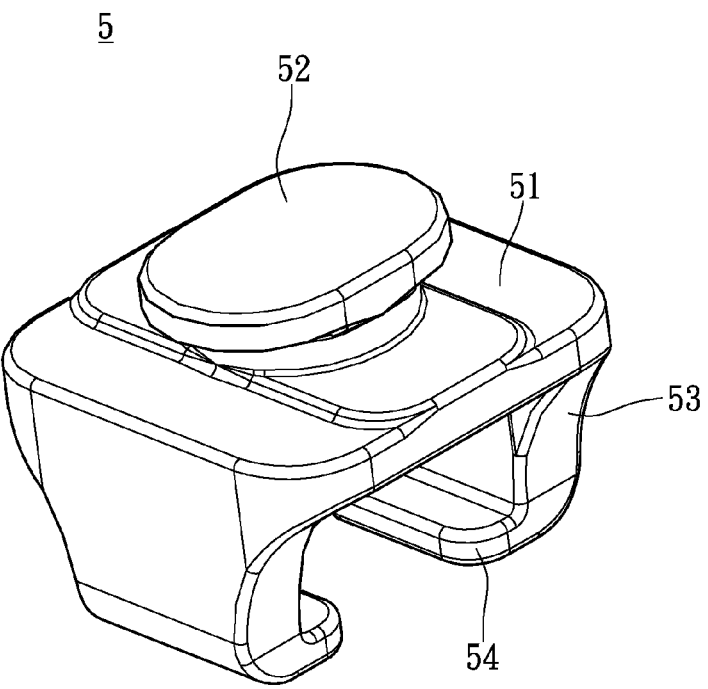
FIG. 3 shows a three-dimensional view of a fastening member according to the first embodiment of the instant disclosure.
Figure 4:
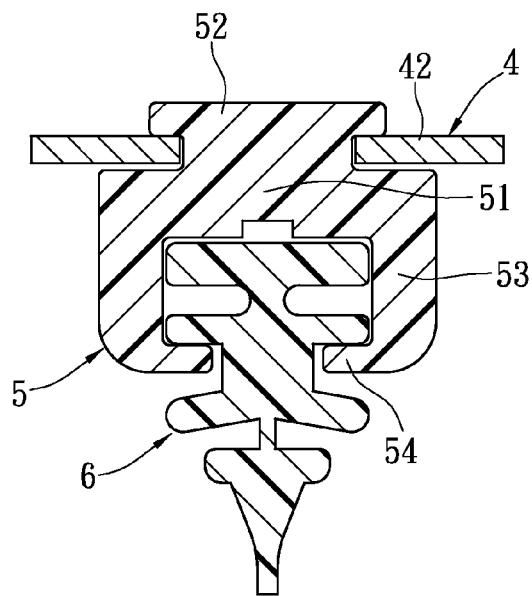
FIG. 4 shows a cross-sectional view of the fastening member according to the first embodiment of the instant disclosure.

Please refer to FIGS. 1, 3 and 4. Each of the second loading portion 42 has two long fastening holes 421, where two fastening members 5 are provided to insert into the fastening hole 421 to engage onto the flexible member 4. The fastening member 5 is integrally formed as a single unit, where the fastening member 5 has a long plate 51. The long plate 51 extends upwardly and has a long plate 52 connected thereto. The two sides of the long plate 51 extend downwardly to form a side plate 53 respectively. Each side plate 53 has a hook portion 54 formed on the distal end thereof which bends inwardly. The fastening member 5 is inserted through the fastening hole 421 of the second loading portion 42 from the bottom direction. The fastening member 5 is rotated for the two ends of the long plate 52 to abut against the top surface of the second loading portion 42, and the long plate 51 to abut against the bottom surface of the second loading portion 42, such that the fastening member 5 can be engaged to the flexible member 4 in a rotatable manner. Furthermore, the wiper blade 6 is fixed by the two side plate 53 and the two hook portion 54 which bend inwardly. Once again, the rigid frame 3 of the instant disclosure is preferably made of a hard material, however, this is not restricted thereto.

Figure 5:
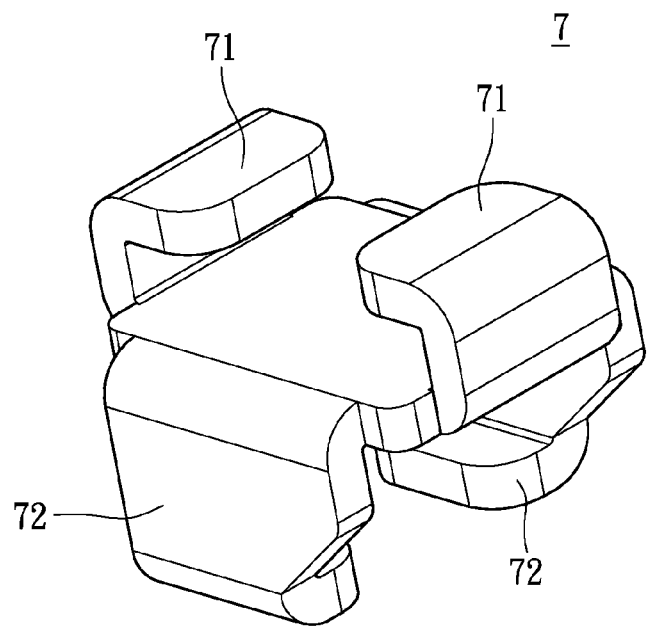
FIG. 5 shows a three-dimensional view of the engaging member of the instant disclosure.

Please refer to FIGS. 1 and 5, the other distal end of the second loading portion 42, away from the central loading portion 41, has two engaging holes 422 for an engaging member 7 to fix thereto. The engaging member 7 includes two first hooks 71 which extend upwardly and two second hooks 72 which extend downwardly. The engaging member 7 inserts through the two engaging holes 422 from the bottom to top direction such that the first hooks 71 are mounted to the two engaging holes 422, and the wiper blade 6 is fixed by the two second hooks 72.

Referring again to FIGS. 1, 2 and 4. The wiper blade 6 is inserted through the plurality of fastening members 5 and the engaging member 7 to fix to the lower portion of the flexible member 4. The top portion of the flexible member 4 has a reinforcing member 2 sleevingly coupled thereto. To provide further explanations, the reinforcing member 2 covers the top portion and a partial of the lower portion of the flexible member 4. The reinforcing member 2 has an opening portion 21 formed on the center thereof such that the covered rigid frame 3 can be exposed therefrom to assemble with the wiper connector 1.

Figure 6:
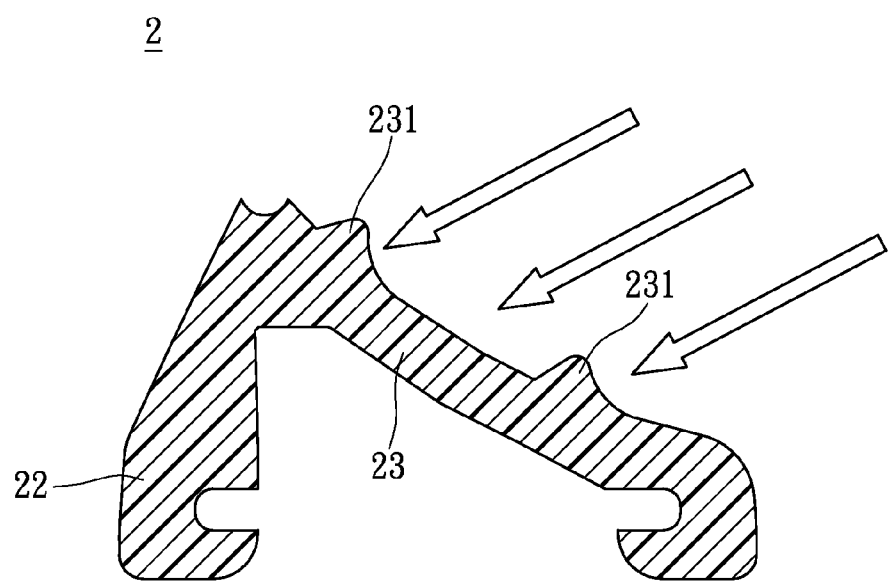
FIG. 6 shows a cross-sectional view of a reinforcing member of the instant disclosure.

Please refer to FIGS. 1 and 6, where FIG. 6 shows a cross-sectional view of the reinforcing member 2. The reinforcing member 2 is made up mainly of a first wall 22 and a second wall 23 which extends forwardly. The first wall 22 and second wall 23 has an acute angle formed therebetween, and the width of the second wall 23 is apparently greater than that of the first wall 22. The outer surfaces of the first wall 22 and the second wall 23 define a front-facing side of the reinforcing member 2 (here "front-facing" refers to "forward-facing," i.e., facing toward the front of the vehicle). The wiper is applied on cars, and while the car is driving, the wind pressure will be redirected on a front-facing side (the arrow refers to the wind direction) of the reinforcing member 2, such that the reinforcing member 2 can redirect the wind pressure to depress the wiper so as to enable better conformity between the wiper and the windshield. The front-facing side has at least one wind-deflecting rib formed thereon. For the instant disclosure, the second wall 23 has two wind-deflecting ribs 231 protrudingly formed thereon. The wind-deflecting ribs 231 protrude from the two sides of the reinforcing member 2 into the distal ends of the second wall 23. The wind-deflecting ribs 231 can redirect the wind pressure on the surface of the second wall 23, and by redirecting the wind pressure, the reinforcing member 2 can provide a higher pressing force to the soft wiper blade, thereby enabling better conformity of the soft wiper blade to the contour of the windshield. The reinforcing member 2 of the instant disclosure has a hardness degree roughly 40% greater than that of the wiper blade 6, however this is not restricted thereto.

Please refer to FIG. 1. For the instant disclosure, the flexible member 4 and the wiper blade 6 are assembled through the fastening member 5. The fastening member 5 can be engaged to the flexible member 4 in a rotatable manner, while the wiper blade 6 and the fastening member 5 can be mutually mounted to each other. In other words, the flexible member 4 and the wiper blade 6 can be assembled through a rotatable manner and also multiple mounting means, such that the two components can be dismantled quickly, however, do not detach easily.

[The Second Embodiment]

Figure 7:
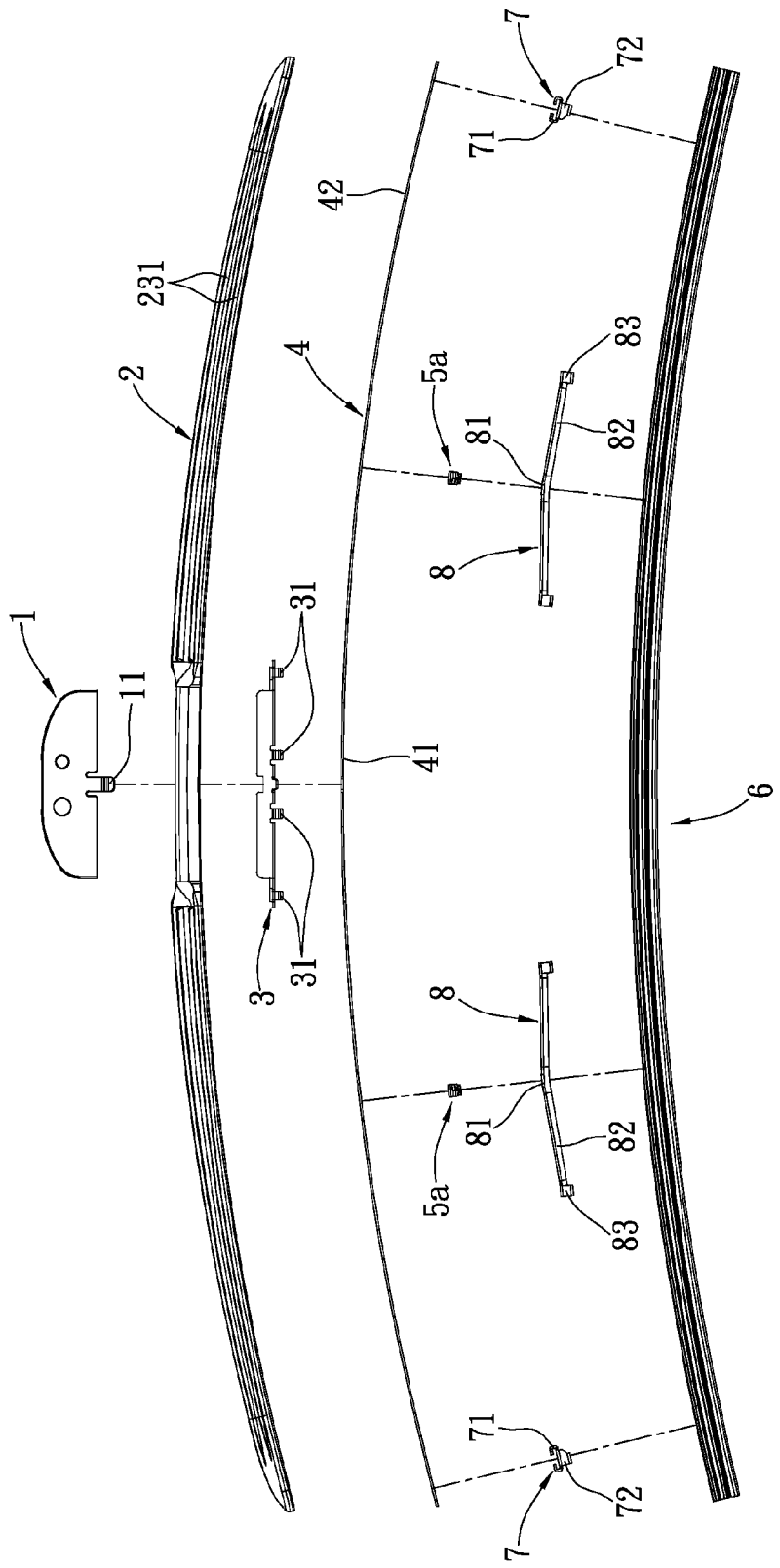
FIG. 7 shows an exploded view of a wiper observing from the front according to a second embodiment of the instant disclosure.
Figure 8:
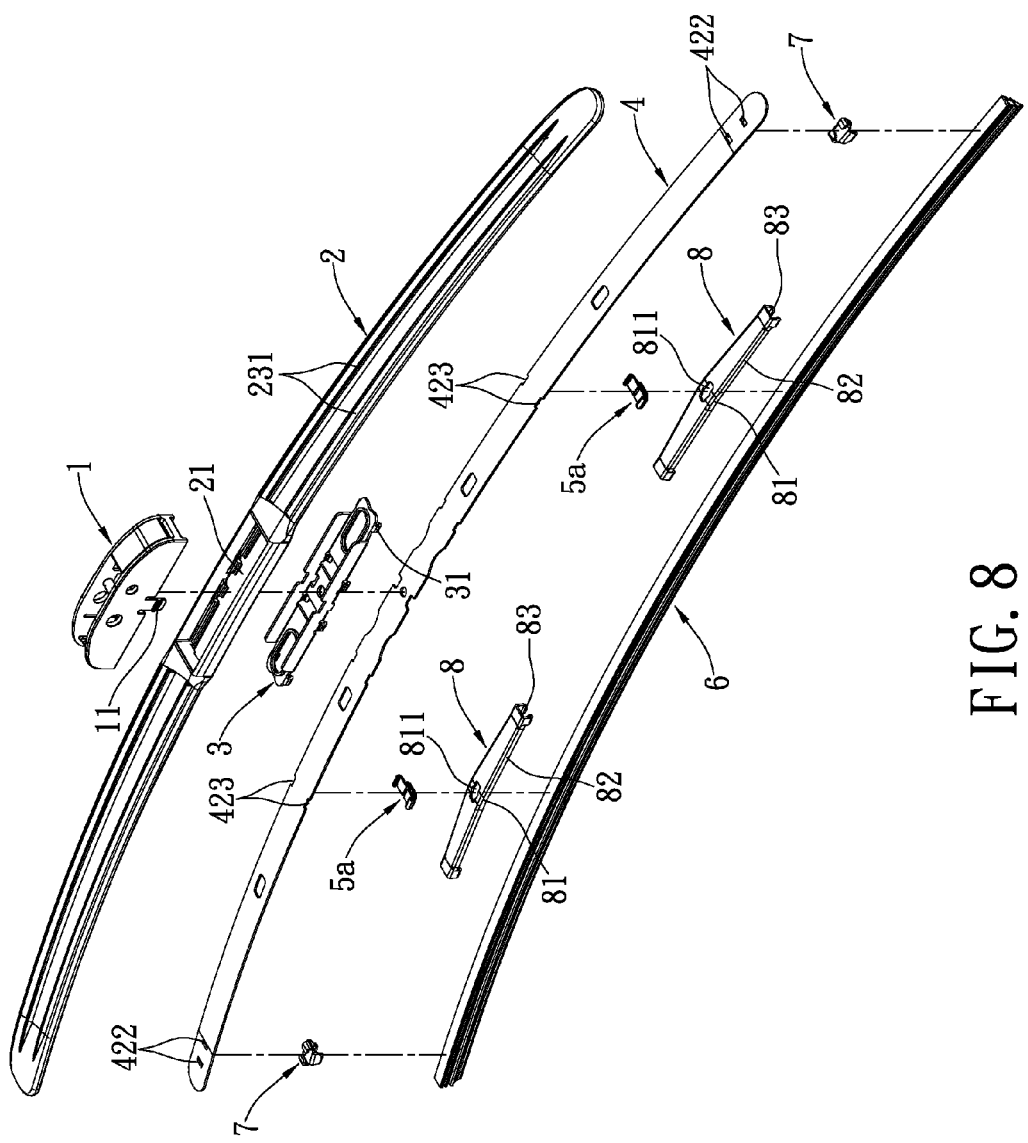
FIG. 8 shows a three-dimensional exploded view of the wiper according to the second embodiment of the instant disclosure.

Please refer to FIGS. 7 and 8. The wiper of the instant disclosure includes a wiper connector 1, a reinforcing member 2, a rigid frame 3, a flexible member 4, a plurality of fastening member 5a, a plurality of pressing members 8 and a wiper blade 6. The differences of the instant embodiment from the prior embodiment, is that the instant embodiment has a fastening member 5a appearing in different forms and the pressing member 8 is arranged below the fastening member 5a.

Figure 9:
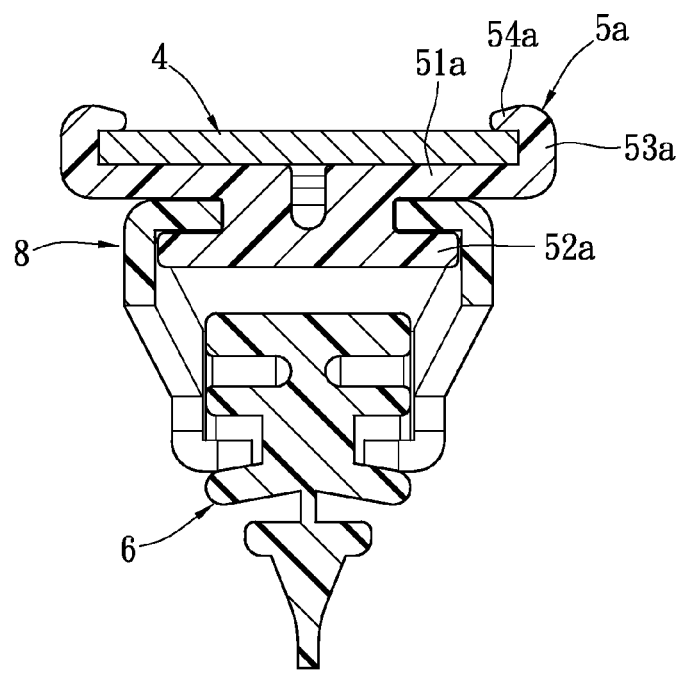
FIG. 9 shows a cross-sectional view of a fastening member according to the second embodiment of the instant disclosure.
Figure 10:
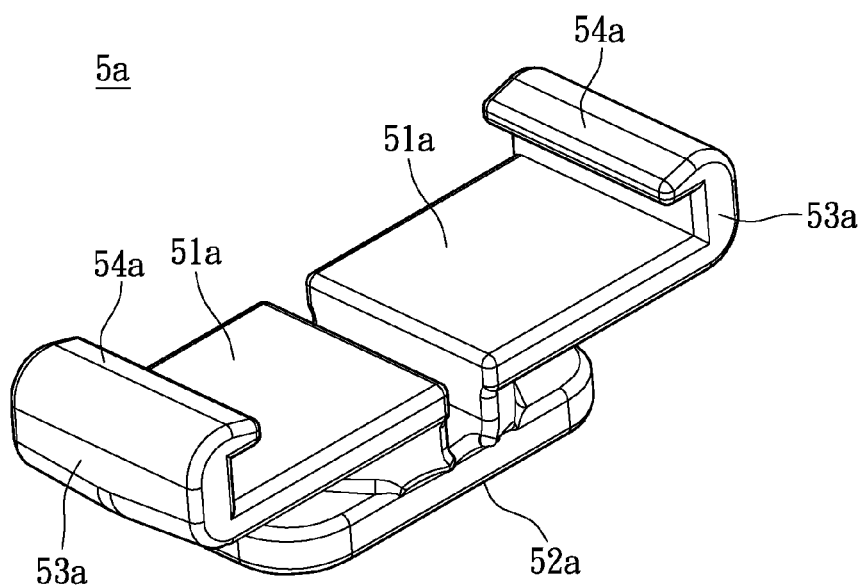
FIG. 10 shows a three-dimensional perspective view of the fastening member according to the second embodiment of the instant disclosure.

Please refer to FIGS. 9 and 10. The fastening member 5a is integrally formed as a single unit. The fastening member 5a has a long plate 51a, where the center of the long plate 51a has a buffer trough formed thereon. The two sides of the long plate 51a extend upwardly to form a side plate 53a respectively. Each of the distal ends of the two side plate 53a has a pair of hook portions 54a bending inwardly formed therein, the long plate 51a extends downwardly and is connected to a long plate 52a. The fastening member 5a is engaged to the second loading portion 42 of the flexible member 4 from the bottom to top direction. To provide further explanations, please refer to FIG. 8, the second loading member has an indentation 423 formed on the engaging position for the fastening member 5a to engage thereto.

The long plate 52a can engage to the pressing member 8, at the bottom thereof, in a rotatable manner. The pressing member 8 includes a positioning portion 81, two hard arms 82 and two coupling portions 83. The positioning portion 81 is arranged on the center of the pressing member 8, where the positioning portion 81 includes a long positioning hole 811 for the long plate 52a of the fastening member 5a to insert therethrough. The two sides of the long plate 52a abut against the lower surface of the positioning portion 81, and the long plate 51a abut against the upper surface of the positioning portion 81, such that the pressing member 8 and the fastening member 5a can be engaged in a rotatable manner. The two hard arms 82 extend in a slant manner from the two distal ends of the positioning portion 81. The distal ends of the two hard arms 82 are connected respectively to a coupling portion 83, where the coupling portion 83 is substantially a C shape for the wiper blade 6 to be fixed therein.

Please refer to FIG. 7. The flexible member 4 and the wiper blade 6 of the instant embodiment are assembled through the fastening member 5a and the pressing member 8. The fastening member 5a and the flexible member 4 are mutually engaged, however not in a rotatable manner, while the pressing member 8 and the wiper blade 6 are mutually inserted with each other. The fastening member 5a and the pressing member 8 are engaged in a rotatable manner such that the two components can be dismantled quickly, however do not detach easily.

[The Third Embodiment]

Figure 11:
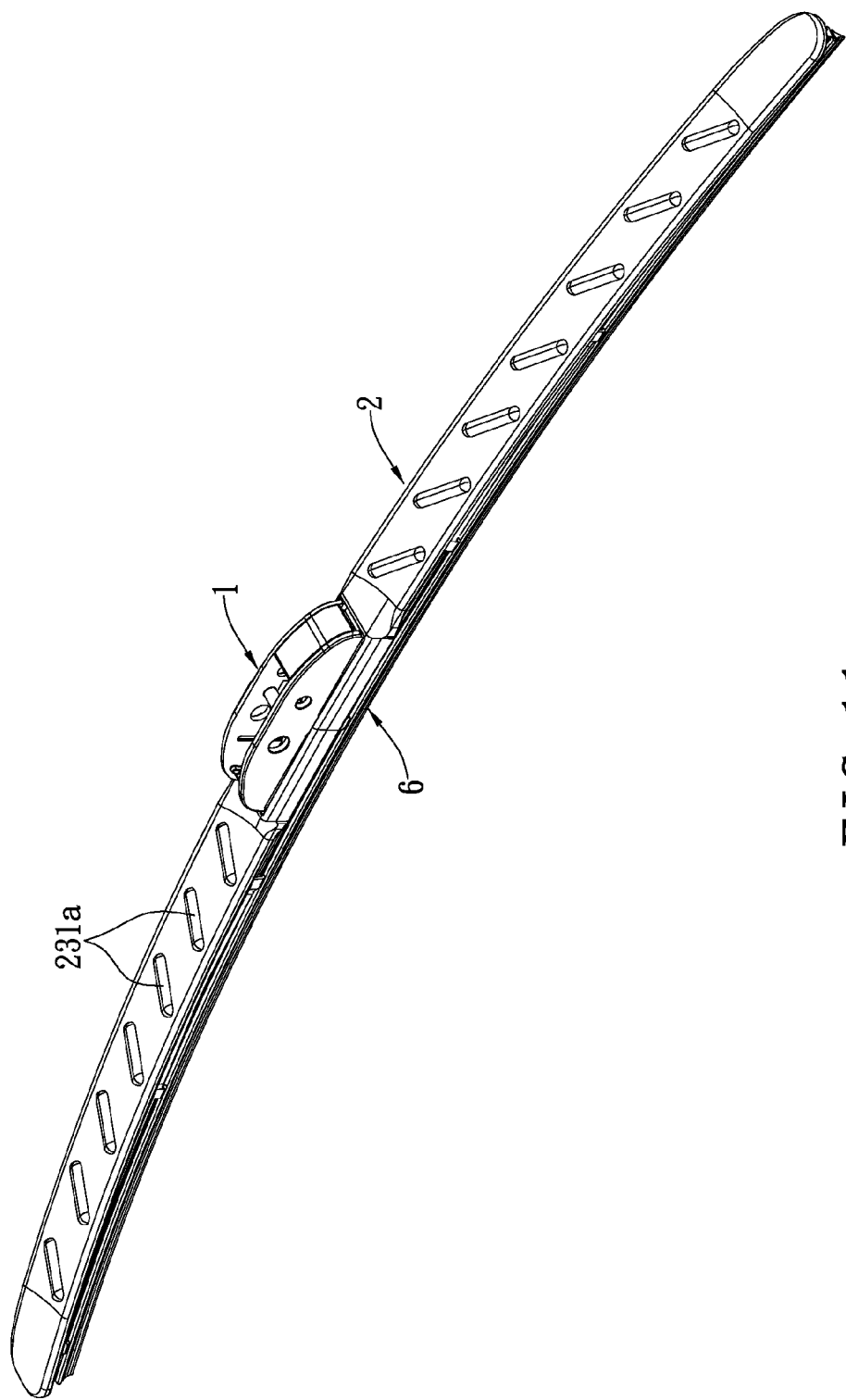
FIG. 11 shows an assembled perspective view of a wiper according to a third embodiment of the instant disclosure.

Please refer to FIGS. 6 and 11, the instant embodiment further includes a reinforcing member 2, where the reinforcing member 2 is made up mainly of a first wall 22 and a second wall 23 which extend forwardly. The first wall 22 and the second wall 23 have an acute angle formed therebetween, and the width of the second wall 23 is apparently greater than that of the first wall 22. The outer surfaces of the first wall 22 and the second wall 23 form a front-facing side of the reinforcing member 2. When the car is driving, the wind pressure will be redirected onto a front-facing side (the arrow refers to the direction of the wind) of the reinforcing member 2, such that the reinforcing member 2 can redirect the wind pressure to depress the wiper so as to enable better conformity of the wiper to the windshield. The front-facing side has at least one wind-deflecting rib formed thereon. For the instant disclosure, the second wall 23 has a plurality of wind-deflecting ribs 231a protrudingly formed thereon. The wind-deflecting ribs 231a can redirect the wind pressure on the surface of the second wall 23, and by redirecting the wind pressure, the reinforcing member 2 can provide a higher pressuring force.

[The Fourth Embodiment]

Figure 12:
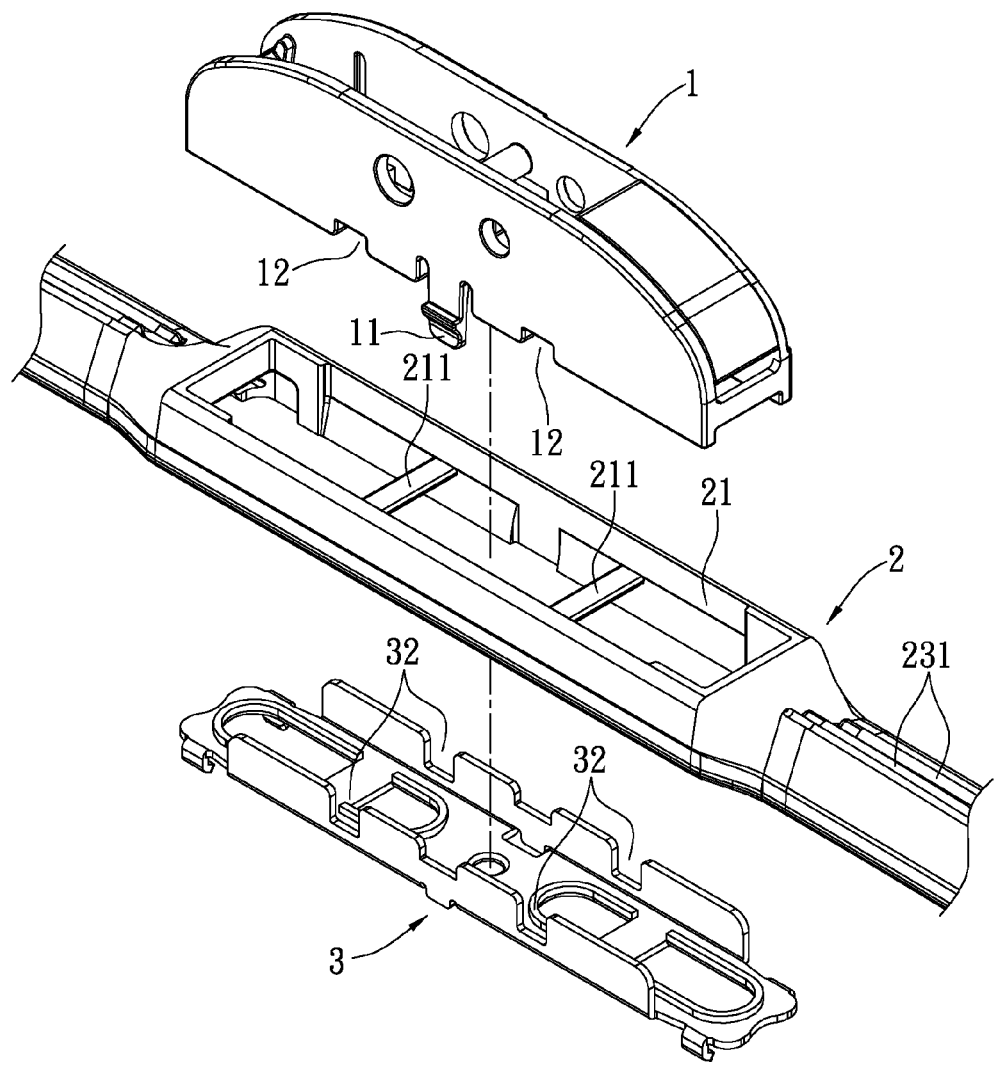
FIG. 12 shows another three-dimensional exploded view of a wiper according to a fourth embodiment of the instant disclosure.

Please refer to FIG. 12, the wiper of the instant embodiment includes a wiper connector 1, a reinforcing member 2 and a rigid frame 3. The middle section of the reinforcing member 2 has at least one latch 211 connected between the two side walls of the reinforcing member 2. The latch 211 is arranged between the upper trough 12 of the wiper connector 1 and the lower trough 32 of the rigid frame 3, such that the middle section of the reinforcing member 2 is tightly engaged to the wiper.

The instant disclosure has the following advantages:

The flexible member has different curvatures formed thereon such that the wiper and the windshield can achieve a higher conformity for better removal of the rain water. Furthermore, the central loading portion of the flexible member has a zero curvature, and thereby the rigid frame can be engaged tightly to the first loading member. Thus, the force exerted by the wiper arm can be applied to the wiper through the wiper connector with little or no resistance, and thereby reducing the inefficiency of the wiper due to gaps formed during assembling. The instant disclosure has a rotatable engaging mechanism and a plurality of mountable engaging mechanisms formed between the wiper blade and the flexible member, such that a convenient and stable assembly can be provided. Furthermore, cases where pursuing an easy dismantling method in conventional assembly, such that too much rotatable engaging mechanisms are used which result in easy detach of the wiper blade can be avoided. The wiper of the instant disclosure has a new form of reinforcing member to achieve a better conformity between the wiper to the windshield through the external wind pressure during driving, and thereby improving the water removal effect.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A windshield wiper, comprising:
a wiper connector;
a flexible member including a generally elongated central loading portion and two second loading portions extending substantially symmetrically from two ends of the central loading portion, wherein the central loading portion has a zero curvature;
a reinforcing member sleevingly coupled to the flexible member, wherein a front-facing side thereof has at least one wind-deflecting rib arranged thereon;
a rigid frame arranged on the central loading portion of the flexible member for connecting the wiper connector;
at least two fastening members respectively connected to the two second loading portions; and
a wiper blade fixed to the at least two fastening members, wherein each of the at least two fastening members has a support, a long plate and two side plates, wherein within each respective fastening member the support extends upwardly and is connected to the long plate, and wherein each of the two side plates extends downwardly from the support, and each of the distal ends of the respective two side plates has a hook portion which bends inwardly,
wherein each of the two second loading portions has a plurality of long fastening holes formed thereon, wherein respective long plates are inserted through the plurality of long fastening holes for respective fastening members to engage rotatably to the second loading portion.

2. The wiper according to claim 1, wherein a curvature of each of the two second loading portions is greater than that of the central loading portion.

3. The wiper according to claim 1, wherein a center of the reinforcing member has an opening portion formed therein for the rigid frame to expose therefrom for connection to the wiper connector.

4. A windshield wiper, comprising:
a wiper connector;
a flexible member including a generally elongated central loading portion and two second loading portions extending substantially symmetrically from two ends of the central loading portion, wherein the central loading portion has a zero curvature;
a reinforcing member sleevingly coupled to the flexible member, wherein a front-facing side thereof has at least one wind-deflecting rib arranged thereon;
a rigid frame arranged on the central loading portion of the flexible member for connecting the wiper connector;
at least two fastening members respectively connected to the two second loading portions;
a wiper blade fixed to the at least two fastening members; and
two engaging members, wherein each of the engaging members has two first hooks which extend upwardly and two second hooks which extend downwardly, wherein two engaging holes are formed respectively on two distal ends respectively located on the two second loading portions, away from the central loading portion, wherein the two first hooks of each engaging member are engaged to the two engaging holes at respective distal ends, and the wiper blade is fixed by the two second hooks of each engaging member.

5. The wiper according to claim 4, wherein the center of the reinforcing member has an opening portion formed therein for the rigid frame to expose therefrom for connection to the wiper connector.

6. The wiper according to claim 4, wherein a curvature of each of the two second loading portions is greater than that of the central loading portion.

* * * * *